(12) United States Patent
Snyder et al.

(10) Patent No.: US 10,568,807 B2
(45) Date of Patent: Feb. 25, 2020

(54) STORAGE BAG

(71) Applicant: W. L. Gore & Associates, Inc., Newark, DE (US)

(72) Inventors: Bret A. Snyder, Wilmington, DE (US); Basak Irem Nase, Landenberg, PA (US); John E. Bacino, Landenberg, PA (US); William Shamrock, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 519 days.

(21) Appl. No.: 14/447,745

(22) Filed: Jul. 31, 2014

(65) Prior Publication Data
US 2016/0030283 A1 Feb. 4, 2016

(51) Int. Cl.
*B65D 33/02* (2006.01)
*B65D 33/16* (2006.01)
(Continued)

(52) U.S. Cl.
CPC ............ *A61J 1/10* (2013.01); *B29B 11/14* (2013.01); *B65D 33/065* (2013.01);
(Continued)

(58) Field of Classification Search
USPC ...... 383/42, 29, 30, 31, 78, 83, 84, 85, 105, 383/107, 108, 109, 113, 114, 115, 119,
(Continued)

(56) References Cited

U.S. PATENT DOCUMENTS

| 1,920,700 A | * | 8/1933 | Jaite | B65D 33/02 |
| | | | | 229/5.5 |
| 2,837,267 A | * | 6/1958 | Potdevin | B65D 31/10 |
| | | | | 383/123 |

(Continued)

FOREIGN PATENT DOCUMENTS

EP 0457256 8/1994
EP 0675053 10/1995
(Continued)

OTHER PUBLICATIONS

International Search Report, PCT/US21015/039531, dated Aug. 25, 2015, 5 pages.

*Primary Examiner* — Jes F Pascua
*Assistant Examiner* — Nina K Attel
(74) *Attorney, Agent, or Firm* — Greenberg Traurig, LLP

(57) ABSTRACT

A method of making a storage bag comprising the following steps performed in any order: (a) forming a composite tube having an inner surface comprising a higher melting polymer, an outer surface comprising a lower melting polymer, two ends, and a diameter; (b) flattening the tube in a direction perpendicular to the diameter; (c) forming a joint at one of the ends at a temperature between respective melting points of the higher melting polymer and the lower melting polymer; (d) providing a composite sheet having a first side comprising a higher melting polymer and a second side comprising a lower melting polymer; and (e) disposing the composite sheet over the joint such that the first side comprising a lower melting polymer engages the joint and forming a lap seam over the joint at a temperature between respective melting points of the higher melting polymer and the lower melting polymer, and a storage bag made by such method.

11 Claims, 8 Drawing Sheets

(51) Int. Cl.
*A61J 1/10* (2006.01)
*B65D 33/06* (2006.01)
*B29B 11/14* (2006.01)
A61J 1/14 (2006.01)
B29C 65/00 (2006.01)
B29L 31/00 (2006.01)

(52) U.S. Cl.
CPC ............. *A61J 1/1475* (2013.01); *B29C 66/71* (2013.01); *B29C 66/723* (2013.01); *B29C 66/73116* (2013.01); *B29K 2715/00* (2013.01); *B29L 2031/7148* (2013.01)

(58) Field of Classification Search
USPC ............. 383/121, 121.1, 123, 124; 604/262; 206/484.2
See application file for complete search history.

(56) References Cited

U.S. PATENT DOCUMENTS

| | | | | |
|---|---|---|---|---|
| 3,570,375 | A * | 3/1971 | Williams | B29C 66/004 156/289 |
| 3,797,493 | A * | 3/1974 | Saudek | B65D 75/68 206/438 |
| 3,942,529 | A | 3/1976 | Waage | |
| 4,212,299 | A | 7/1980 | Yokokoji et al. | |
| 4,971,454 | A * | 11/1990 | Branson | B65D 33/22 383/109 |
| 5,374,473 | A | 12/1994 | Knox et al. | |
| 6,024,220 | A * | 2/2000 | Smith | B29C 66/24244 206/219 |
| 7,521,010 | B2 | 4/2009 | Kennedy et al. | |
| 7,824,720 | B2 * | 11/2010 | Unwin | A47J 37/0871 220/573.2 |
| 2006/0032779 | A1 * | 2/2006 | Tanaka | B65D 81/052 206/522 |
| 2011/0103720 | A1 | 5/2011 | De Muinck | |
| 2011/0252748 | A1 * | 10/2011 | Ishihara | A01N 1/02 53/461 |
| 2014/0133785 | A1 * | 5/2014 | Diviesti | A61F 13/0008 383/210.1 |

FOREIGN PATENT DOCUMENTS

| | | |
|---|---|---|
| EP | 1864641 | 3/2014 |
| JP | S34-001895 | 4/1959 |
| JP | S54103184 | 8/1979 |
| JP | H03-131260 A | 6/1991 |
| JP | H08-119292 A | 5/1996 |
| JP | H11-290421 A | 10/1999 |
| JP | 2007-276884 A | 10/2007 |
| JP | 4421046 | 2/2010 |
| WO | 0963326 | 12/1999 |
| WO | 1535723 | 6/2005 |

\* cited by examiner

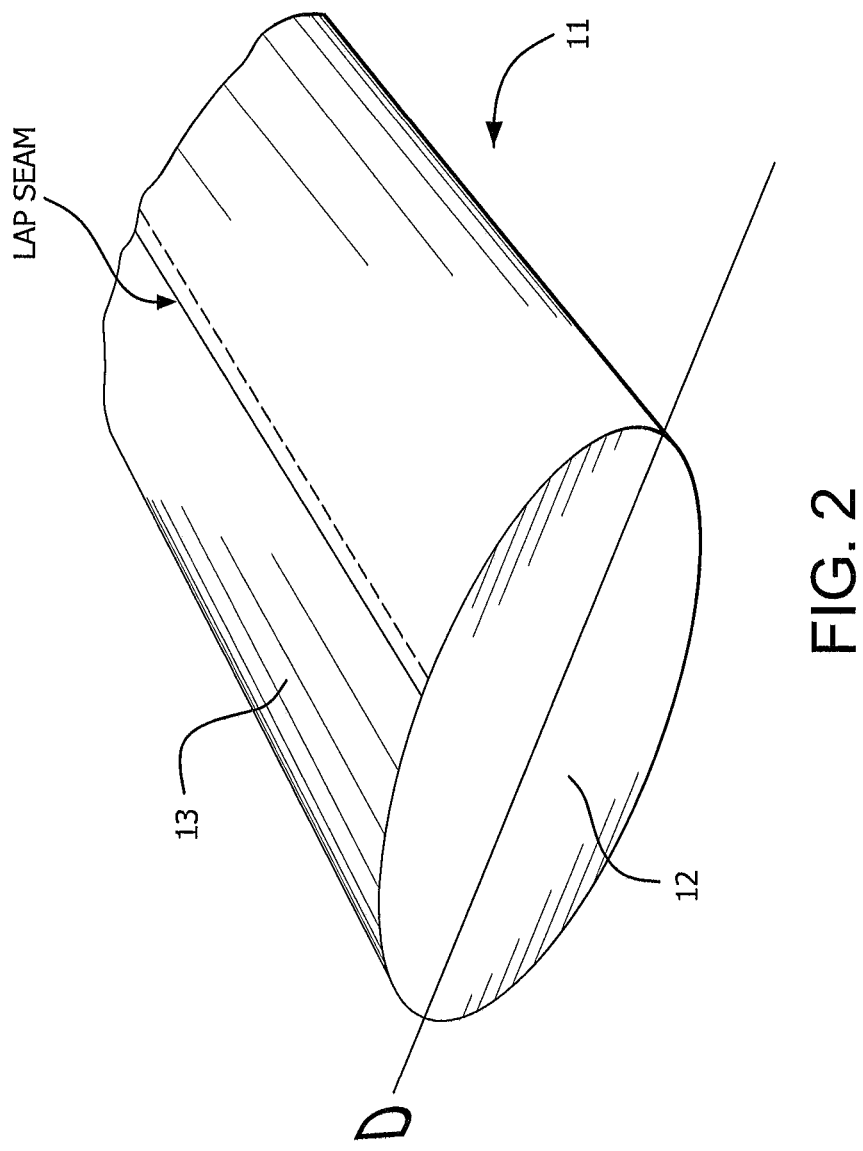

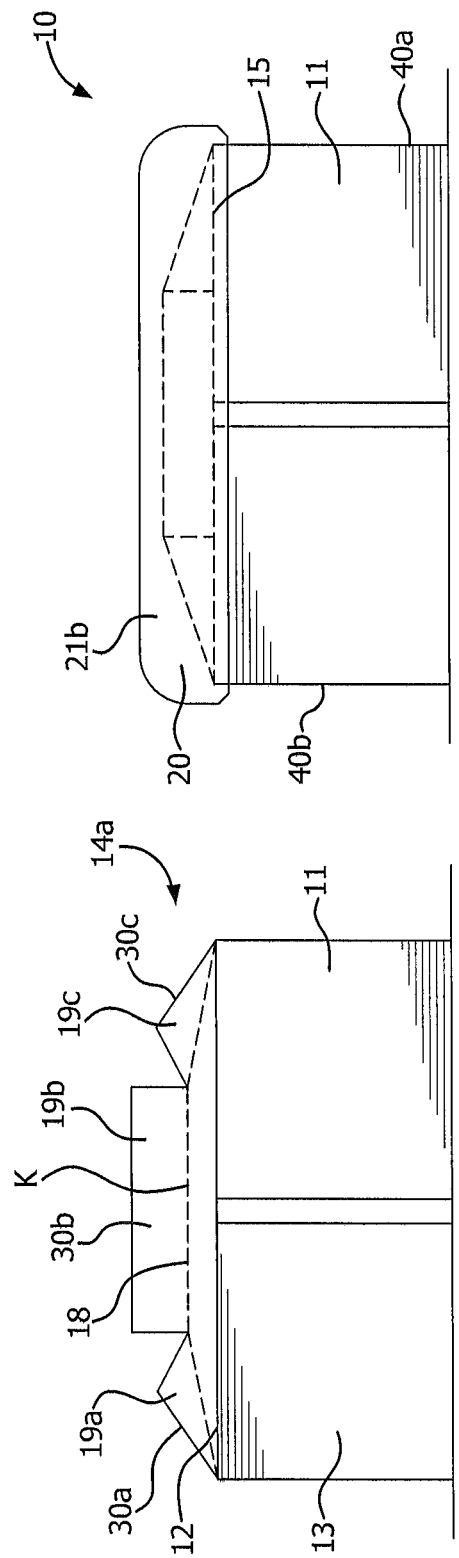

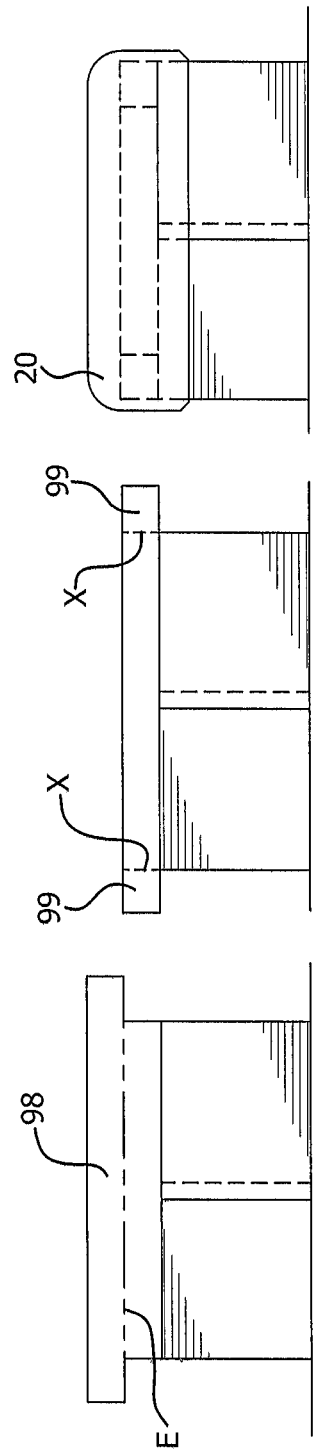

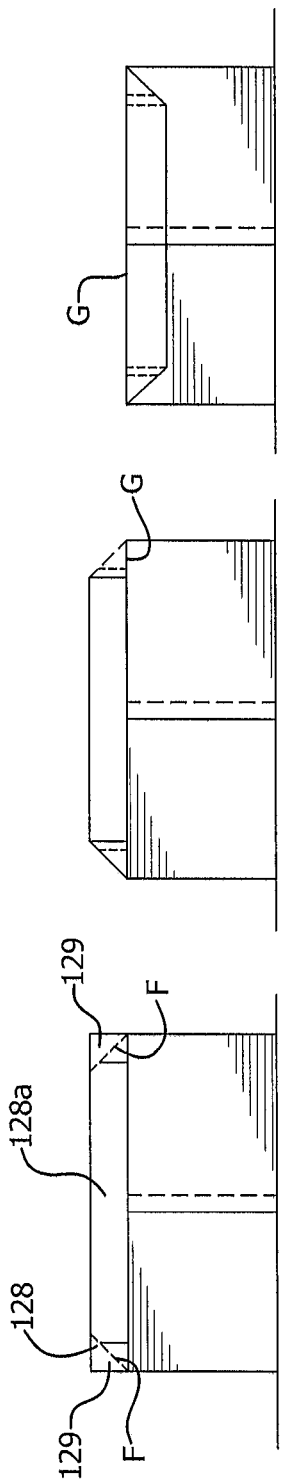

STORAGE BAG

FIELD

The present disclosure relates to storage bags, and more particularly, to cryopreservation bags.

BACKGROUND

Single-use flexible containers are used for transportation and storage of materials such as biologics. Such containers are flexible bags that are typically made out of plastic film. The bags may be used for storage and particularly in cryopreservation applications. The bags are typically disposable and intended to reduce risk of cross contamination and the need for cleaning validation.

In the cryopreservation application, biologic bulk drug substances are stored and transported frozen in the storage bags. This maintains protein stability over storage time. Current bags have certain drawbacks, including durability at freezing temperatures (which can be as low as −80° C.) and during warm-up and usage of the bags. There is also the risk of plastic extractables interacting with the drug substances in existing storage bags. Moreover, existing bags tend to have leakage problems, particularly at the ends and corners of the bags.

A storage bag particularly for cryogenic applications with improved durability with low extractables and reduced leakage is therefore desirable.

SUMMARY

In a first aspect, this disclosure provides a method of making a storage bag comprising the following steps performed in any order: (a) forming a composite tube having an inner surface comprising a higher melting polymer, an outer surface comprising a lower melting polymer, two ends, and a diameter; (b) flattening the tube in a direction perpendicular to the diameter; (c) forming a joint at one of the ends at a temperature between respective melting points of the higher melting polymer and the lower melting polymer; (d) providing a composite sheet having a first side comprising a higher melting polymer and a second side comprising a lower melting polymer; and (e) disposing the composite sheet over the joint such that the first side comprising a lower melting polymer engages the joint and forming a lap seam over the joint at a temperature between respective melting points of the higher melting polymer and the lower melting polymer. In alternative embodiments, the storage bag is a cryoprotective bag; the steps (c) through (e) are performed at the other of the two ends; step (e) further comprises disposing a composite sheet on a back side of the joint; step (e) comprises folding the composite sheet over one of the ends to form lap seam over front and back sides of the joint; the higher melting polymer is a non-melt-processable polymer; the higher melting polymer is polytetrafluoroethylene; the higher melting polymer is a polyimide such as Kapton®; the lower melting polymer is a melt-processable polymer; and the lower melting polymer is fluorinated ethylene propylene ("FEP").

In a particularly preferred embodiment, this disclosure provides a method of making a cryopreservation bag comprising the following steps performed in any order: (a) forming a composite tube having an inner surface comprising a non-melt-processable polymer, an outer surface comprising a melt-processable polymer, two ends, and a diameter dividing the tube into a first half and a second half; (b) providing, on at least one of the two ends of said tube, an extension of the first half of the tube; (c) flattening the tube in a direction perpendicular to the diameter; (e) dividing the extension into at least three sections having edges; (f) folding the three sections such that the edges engage the second half of the tube to form a joint; (g) providing a composite sheet having a first side comprising a non-melt-processable polymer and a second side comprising a melt-processable polymer; and (h) folding the composite sheet over the joint such that the second side comprising a melt-processable polymer engages the joint to form a lap seam over the joint.

In another aspect, this disclosure provides a storage bag having two edges and two ends comprising a first face and a second face integrally joined at the two edges of the bag and defining an inner surface and an outer surface of the bag; the inner surface comprising a higher melting polymer, and the outer surface comprising a lower melting polymer; a joint at one of the ends; a discrete composite sheet having a first side comprising a higher melting polymer and a second side comprising a lower melting polymer folded over the joint with the first side comprising a lower melting polymer engaging the joint to form a lap seam over the joint.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 2 is a perspective view of a component of a storage bag in accordance with an exemplary embodiment.

FIG. 3 is a partial front view of a component of a storage bag in accordance with an exemplary embodiment.

FIG. 4 is a partial front view of a storage bag in accordance with an exemplary embodiment.

FIG. 9 is a partial front view of a component of a storage bag in accordance with an exemplary embodiment.

FIG. 10 is a partial front view of a component of a storage bag in accordance with an exemplary embodiment.

FIG. 11 is a partial front view of a storage bag in accordance with an exemplary embodiment.

FIG. 12 is a partial front view of a storage bag in accordance with an exemplary embodiment.

FIG. 13 is a partial front view of a storage bag in accordance with an exemplary embodiment.

FIG. 14 is a partial front view of a storage bag in accordance with an exemplary embodiment.

DETAILED DESCRIPTION

Figure 1:
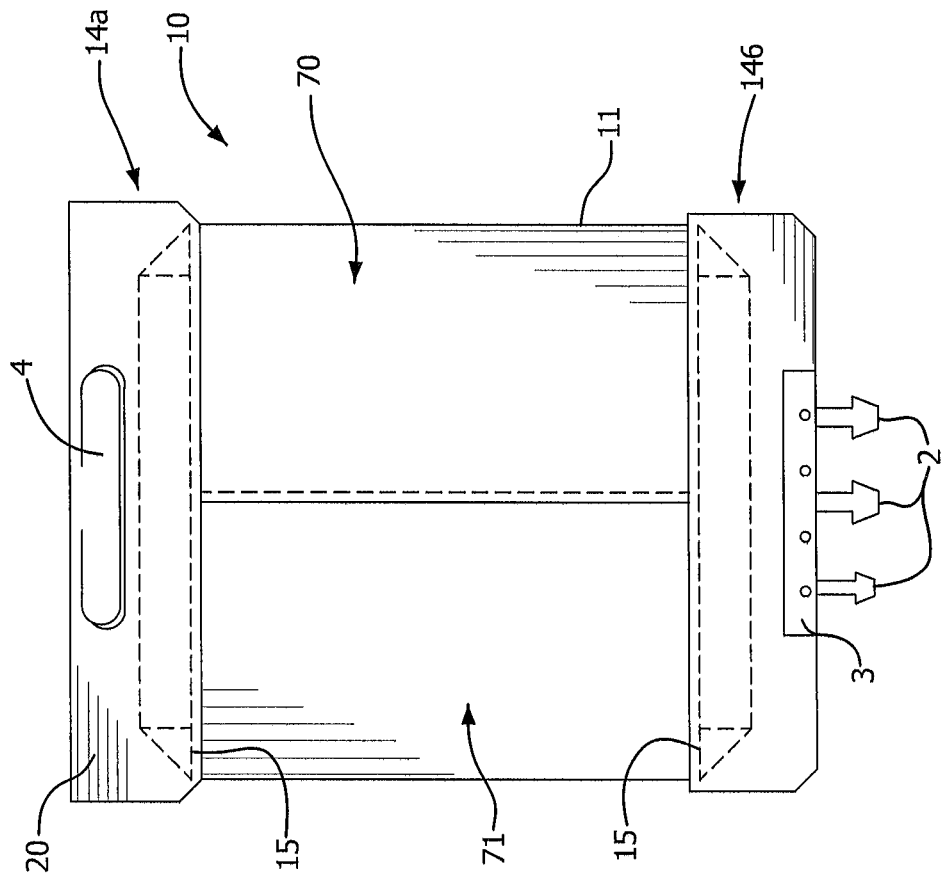
FIG. 1 is a front view of a storage bag in accordance with an exemplary embodiment.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

Preferred embodiments of the disclosure will now be described in connection with the attached figures. In FIG. 1, an exemplary storage bag 10 is illustrated. Storage bag 10 is formed of a composite tube 11 having ends 14a and 14b and a front side 70 and a back side 71. End 14a in this embodiment is a handle end. End 14b in this embodiment is a port end. Port end 14b has a clamp 3 and ports 2 formed thereon. Ports 2 may be formed by puncturing port end 14b. Specifically, before composite tube 11 is formed, holes are punctured therein and then a molded piece having ports 2 is attached to the outside of composite tube 11. The subsequent steps for forming the bag are then followed as described herein. In a preferred embodiment, a molded piece having ports 2 is provided and attached to the bag after formation of the composite tube 11. Handle end 14a in this embodiment has handle 4 formed therein.

At each end 14a and 14b, the composite tube 11 is folded to form a joint 15. Also at each end 14a and 14b, a discrete composite sheet 20 is disposed over joint 15 to form a lap seam over joint 15. As used herein, "joint" means an interface that includes two abutting edges, edges that are in near abutment, and edges that overlap; "lap seam" means a seam having edges that overlap one another; and "cryo-preservation" means storage or preservation at cold temperatures below zero degrees C.

Composite tube 11 is preferably formed by creating a tube of a sheet of composite material as illustrated in FIG. 2. Composite tube 11 has inner surface 12, which preferably comprises a higher melting polymer. Composite tube 11 also has outer surface 13, which is preferably formed of a lower melting polymer. As used herein "higher melting polymer" means a polymer having a melting point at least 30° C., preferably 50° C. above the "lower melting polymer," and "lower melting polymer" correspondingly means a polymer having a melting point at least 50° C. below that of the higher melting polymer. Preferably, the higher melting polymer is a non-melt processable polymer such as polytetrafluoroethylene or a polyimide such as Kapton®, and the lower melting polymer is a melt processable such as fluorinated ethylene propylene ("FEP"). Composite tube 11 has a diameter D, dividing composite tube 11 into a first half and a second half. Composite tube 11 is flattened in a direction perpendicular to diameter D in order to form storage bag 10.

Using the preferred embodiments of the present disclosure provides the distinct advantages of enhanced leak protection at the ends and corners of a storage bag by covering joints with lap seams. A particularly preferred embodiment of this disclosure is illustrated in FIG. 3. FIG. 3 is a depiction of end 14a of composite tube 11. End 14a of composite tube 11 has an extension 18. Extension 18 is an extension of one-half of composite tube 11. Extension 18 is divided into three sections 19a, 19b, and 19c in this preferred embodiment illustrated. Sections 19a, 19b, and 19c have edges 30a, 30b, and 30c as illustrated, respectively. Each of the three sections 19a, 19b, and 19c are folded along fold line K, as illustrated in FIGS. 3 and 4, such that edges 30a, 30b, and 30c engage the other half of composite tube 11 to form a first joint 15.

With reference to FIG. 4, a separate composite sheet 20 having a first side (not shown) formed of a higher melting polymer and a second side 21b formed of a lower melting polymer. Composite sheet 20 is disposed over joint 15 to form a lap seam between composite sheet 20 and composite tube 11 over joint 15. In a particularly preferred embodiment, composite sheet 20 is folded such that it also forms a lap seam on the opposite side of composite tube 11. FIG. 4 also illustrates edges 40a and 40b of composite tube 11 after it is flattened.

In an alternative embodiment, two separate composite sheets 20 may be used, one on each side of composite tube 11, rather than folding over one composite sheet 20. In any embodiment, the lower melting surface of composite sheet 20 bonds with the lower melting surface of composite tube 11 in order create a lap seam over joint 15.

Figure 6:
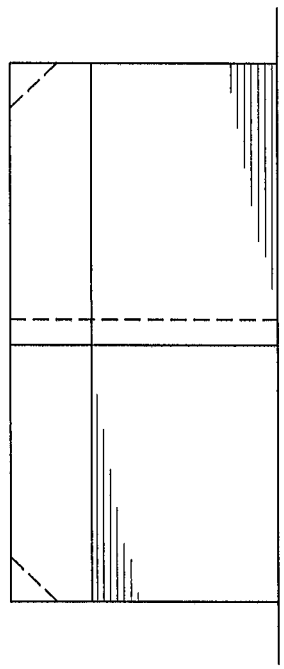
FIG. 6 is a partial front view of a storage bag in accordance with an exemplary embodiment.
Figure 5:
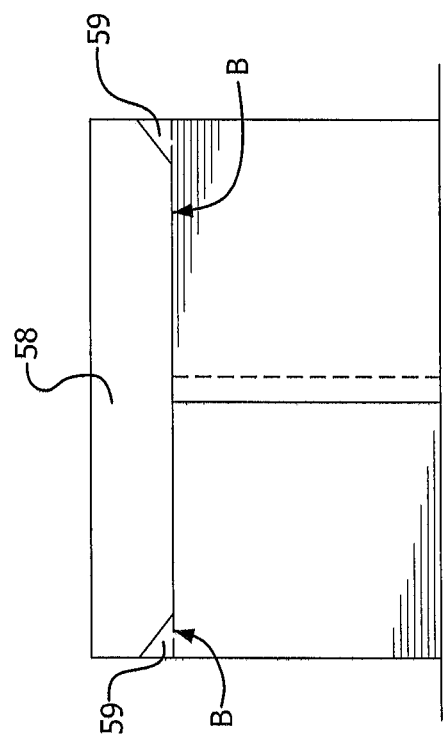
FIG. 5 is a partial front view of a storage bag in accordance with an exemplary embodiment.
Figure 7:
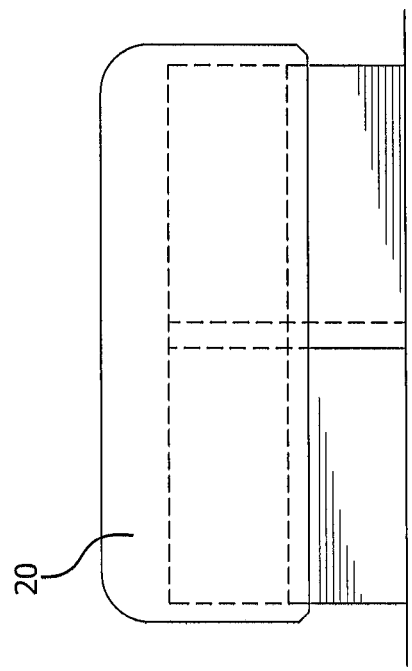
FIG. 7 is a partial front view of a component of a storage bag in accordance with an exemplary embodiment.
Figure 8:
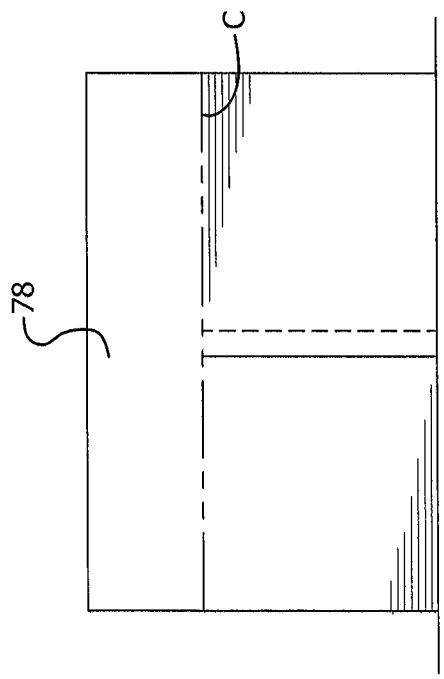
FIG. 8 is a perspective view of a component of a storage bag in accordance with an exemplary embodiment.
Figure 16:
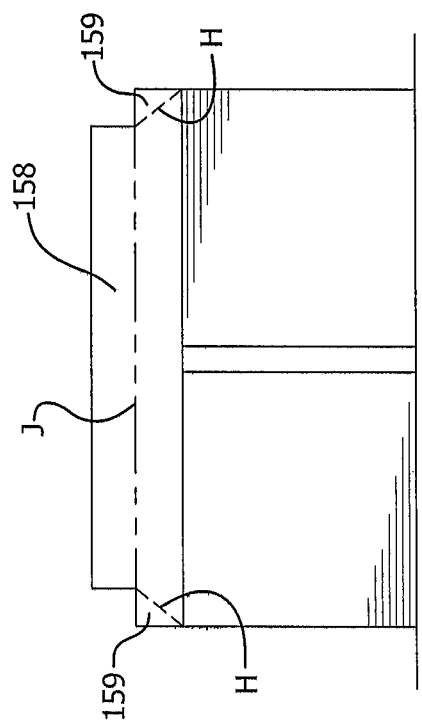
FIG. 16 is a partial front view of a storage bag in accordance with an exemplary embodiment.
Figure 15:
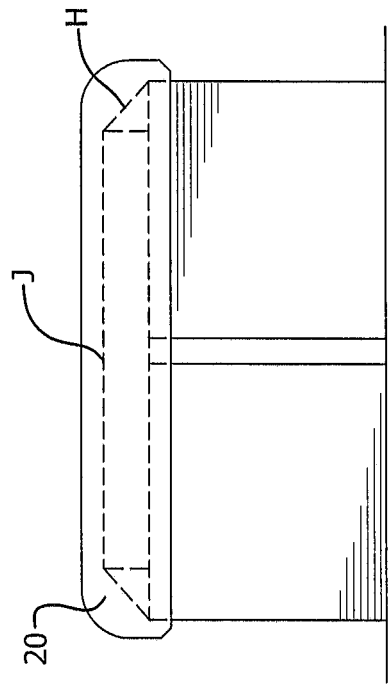
FIG. 15 is a partial front view of a component of a storage bag in accordance with an exemplary embodiment.

FIGS. 5-9 illustrate alternative embodiments. FIG. 5 shows an extension 58 of one half of the composite tube, and partial extensions 59 at the corners of the other half of the composite tube, all of which are folded over fold line B as shown in FIG. 6. FIG. 7 shows extension 78 of one half of the composite tube, which is folded over fold line C and covered with discrete composite sheet 20 as shown in FIG. 8. FIG. 9 shows extension 98 of a particular shape having tabs 99 thereon. Tabs 99 are folded along fold lines X, and extension 98 is folded around fold lie E and covered with discrete composite sheet 20 as shown in FIGS. 10 and 11. FIG. 12 shows extension 128 of one-half of the composite tube and extension 128a of the other half of the composite tube, which together define corners 129. Corners 129 are folded over fold lines F, and the extensions are then folded over fold line Gas shown in FIG. 14. FIG. 15 shows extension 158 of one-half of the composite tube shaped to define corners 159 of the other half of the composite tube. Corners 159 are folded around fold lines H, and the extension is folded over fold line J and covered with discrete composite sheet 20 as shown in FIG. 16.

Although not specifically illustrated herein, port end 14b of storage bag 10 is provided with a lap seam over a joint in similar fashion as described above in connection with handle end 14a. In so doing, a slit is preferably formed in extension 18 on port end 14b in order to facilitate attachment of ports 2. Handle 4 and clamp 3 may be formed as known in the art.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A storage bag comprising:
   a body extending longitudinally from a first end of the bag to a second end of the bag, the body defining an inner surface and an outer surface, wherein the inner surface comprises a higher melting polymer and the outer surface comprises a lower melting polymer, wherein a portion of the inner surface overlaps a portion of the outer surface to form a first lap seam;
   a joint at the first end; and
   a composite sheet having a first side formed of a higher melting polymer and a second side formed of a lower melting polymer, wherein the composite sheet is folded over the joint with the second side comprising the lower melting polymer engaging the joint to form a second lap seam over the joint, wherein, the first lap seam extends longitudinally from the first end to the second end, the first lap seam being positioned between opposing lateral edges of the bag to divide the bag into first and second sides.

2. The storage bag as defined in claim 1 wherein said storage bag is a cryopreservation bag.

3. The storage bag as defined in claim 1 further comprising a handle on one of the first end or the second end and ports and a brace on an opposing one of the first end or the second end.

4. The storage bag as defined in claim 1 wherein said composite sheet is folded over said one of said ends to form the second lap seam over a front side and a back side of said joint.

5. The storage bag as defined in claim 1 wherein said higher melting polymer is a non-melt-processable polymer.

6. The storage bag as defined in claim 1 wherein said higher melting polymer is polytetrafluoroethylene.

7. The storage bag as defined in claim 1 wherein said higher melting polymer is polyimide.

8. The storage bag as defined in claim 1 wherein said lower melting polymer is a melt-processable polymer.

9. The storage bag as defined in claim 1 wherein said lower melting polymer is FEP.

10. The storage bag as defined in claim 1 wherein the body is a composite tube, wherein at least one end of said composite tube comprises an extension which is one-half of said composite tube, wherein said extension is divided into three sections, and wherein each of said three sections are folded to engage the other half of said composite tube to form the joint.

11. The storage bag defined in claim 1 wherein said body comprises a first face and a second face integrally joined at said lateral edges, wherein said body is in the form of a composite tube, wherein at least one end of said composite tube comprises an extension which is one-half of said composite tube, wherein said at least one end of said composite tube comprises partial extensions at corners of the other half of said composite tube, wherein the extension is folded to engage the other half of said composite tube, and wherein the partial extensions are folded over to engage the other half of said composite tube, wherein the folds form the joint.

* * * * *